US007466223B2

(12) United States Patent
Sefton

(10) Patent No.: US 7,466,223 B2
(45) Date of Patent: Dec. 16, 2008

(54) AUTOMATED SITE SECURITY, MONITORING AND ACCESS CONTROL SYSTEM

(75) Inventor: Alan K. Sefton, Knoxville, TN (US)

(73) Assignee: PIPS Technology, Inc., Knoxville, TN (US)

( * ) Notice: Subject to any disclaimer, the term of this patent is extended or adjusted under 35 U.S.C. 154(b) by 43 days.

(21) Appl. No.: 11/425,415

(22) Filed: Jun. 21, 2006

(65) Prior Publication Data

US 2007/0069921 A1    Mar. 29, 2007

Related U.S. Application Data

(63) Continuation-in-part of application No. 10/852,003, filed on May 21, 2004, now Pat. No. 7,119,674.

(51) Int. Cl.
*G08B 19/00* (2006.01)
(52) U.S. Cl. .................. 340/521; 340/937; 340/540; 348/118
(58) Field of Classification Search .................. 340/937, 340/540, 541, 521; 348/118, 148
See application file for complete search history.

(56) References Cited

U.S. PATENT DOCUMENTS

| 4,603,390 A | 7/1986 | Mehdipour et al. |
| 5,034,739 A | 7/1991 | Gruhul |
| 5,381,155 A | 1/1995 | Gerber |
| 5,805,209 A | 9/1998 | Yuge et al. |

(Continued)

OTHER PUBLICATIONS

Shattenstein, Amiel, An Innovative Traffic and Parking Access Control/Management System for Campuses, 2001, Israel.

(Continued)

*Primary Examiner*—Jeff Hofsass
*Assistant Examiner*—Edny Labbees
(74) *Attorney, Agent, or Firm*—Luedeka, Neely & Graham, P.C.

(57) ABSTRACT

The invention provides for automatic monitoring and control of the ingress and egress of vehicles to and from various areas within a secure facility. A plurality of cameras, such as infrared-sensitive cameras, capture images of license plates and/or optically readable passive tags on vehicles traveling into and within the facility. A video image processing system detects and extracts a vehicle license plate number (LPN) or other such identifying characters within the captured image of the license plate. Based at least in part on the location of the camera that captured the LPN, the processor stores the LPN with a time-stamp in one or more vehicle databases, such as a site LPN database, an in-transit database, an employee database, an expected visitor database, a "blacklist" database, a loiterer database, a speeder database, a high-security database, a high-security parking lot database, a normal security parking lot database and a visitor parking lot database. Also, depending at least in part on the location of the camera that captured the LPN and whether the vehicle's LPN is listed in one or more of the above-listed databases, the processor controls the actuation of various barriers or like devices to allow ingress to and egress from various restricted areas within the facility. The processor also preferably controls information posted on various terminals in the site, such as a Security Portal terminal and a parking lot pay booth terminal, and on variable messaging signs at various locations within the facility.

25 Claims, 11 Drawing Sheets

U.S. PATENT DOCUMENTS

| | | | |
|---|---|---|---|
| 5,877,969 | A | 3/1999 | Gerber |
| 6,042,008 | A * | 3/2000 | Ando et al. ............... 235/384 |
| 6,340,935 | B1 | 1/2002 | Hall |
| 6,493,676 | B1 | 12/2002 | Levy |
| 6,630,893 | B2 | 10/2003 | Schuette |
| 6,690,294 | B1 * | 2/2004 | Zierden ............... 340/937 |
| 6,747,687 | B1 | 6/2004 | Alves |
| RE38,626 | E | 10/2004 | Kielland |
| 6,807,464 | B2 * | 10/2004 | Yu et al. ............... 701/1 |
| 6,832,728 | B2 | 12/2004 | Kennedy |
| 6,885,311 | B2 | 4/2005 | Howard et al. |
| 6,885,312 | B1 * | 4/2005 | Kirkpatrick ............... 340/932.2 |
| 6,892,942 | B1 * | 5/2005 | Widl et al. ............... 235/384 |
| 7,102,665 | B1 * | 9/2006 | Chandler et al. ............... 348/148 |
| 7,119,674 | B2 * | 10/2006 | Sefton ............... 340/521 |
| 7,183,895 | B2 * | 2/2007 | Bazakos et al. ............... 340/5.7 |
| 2003/0185340 | A1 * | 10/2003 | Frantz ............... 378/57 |
| 2004/0036573 | A1 | 2/2004 | Fitzgobbon et al. |
| 2004/0165750 | A1 * | 8/2004 | Chew ............... 382/105 |
| 2004/0199785 | A1 * | 10/2004 | Pederson ............... 713/200 |
| 2007/0276561 | A1 * | 11/2007 | Tripathi et al. ............... 701/30 |

OTHER PUBLICATIONS

Vitron, Video Identification System (VIS), Sep. 1993.
Reefe, Mark C., LPR Technology Makes Recording License Plates a Snap, Dec. 2001,1-3, US Customs Today.
Nelson, Lee J., ICR-Based Automatic License Plate Reading for Canadian Customs, Mar. 1993, Advanced Imaging.
Computer Recognition Systems, Computer Recognition Systems—Avista (TM), 2002.
407 Express Toll Route (ETR), Ontario, Canada.
Coyle, Daniel,.Welcome to the Real Data Superhighway, Jan. 1997, BYTE.com
E-470 Public Highway Authority, E-470 Toll Violations.

\* cited by examiner

AUTOMATED SITE SECURITY, MONITORING AND ACCESS CONTROL SYSTEM

This application claims priority as a continuation-in-part to patent application Ser. No. 10/852,003 filed May 21, 2004 now U.S. Pat. No. 7,119,674 titled AUTOMATED SITE SECURITY, MONITORING AND ACCESS CONTROL SYSTEM.

FIELD

This invention relates to security systems. More particularly, the invention relates to the use of cameras and other monitoring devices to provide for automated monitoring and access control of vehicular traffic within secured areas.

BACKGROUND

In today's world, there is an ever-growing concern about limiting and controlling access to areas containing highly-sensitive information and personnel, such as Department of Defense and Department of Energy facilities, research laboratories, airports and military installations. There is also concern about protecting the security of students, such as on high school or university campuses. In the private sector, business operations that occupy large areas, such as hotels and resorts, cruise liner terminals, airports, country clubs, container ports, and large multi-level parking facilities, have a need for monitoring and controlling vehicular access to various zones within the area occupied by the business. Security and vehicular access control may also be mandated for private gated communities.

Prior security systems designed to monitor and control access to such facilities have been lacking in many respects. What is required, therefore, is an improved integrated security system for automatically controlling access to secure areas, for monitoring the movements of vehicles that have been granted access to the secure areas and for providing information in real time to both manned and unmanned security locations regarding such access and movements.

SUMMARY

The above requirements and others are met by an apparatus for automatically monitoring and controlling the ingress and egress of vehicles to and from a facility and various areas within. A preferred embodiment of the invention includes a plurality of cameras, such as infrared-sensitive cameras, for capturing images of the license plates of vehicles traveling into the facility, within the facility, and even exiting the facility. The apparatus includes a video image processing system, such as a software engine running on a computer processor, for detecting and extracting a vehicle license plate number (LPN), or other such identifying characters, within the captured image of the license plate. Based at least in part on the location of the camera that captured the LPN, the processor stores the LPN with a time-stamp and other pertinent information in one or more databases. These databases can include but are not limited to, a site LPN database, an in-transit LPN database, an employee database, an expected visitor database, a blacklist database, also known as "license plates of interest", a loiterer database, a speeder database, a high-security database, a high-security parking lot database, a normal security parking lot database, and a visitor parking lot database. Depending on the location of the camera that captured the LPN and whether the vehicle's LPN is listed in one or more of the above-listed databases, the processor controls the activation of various physical barriers to allow ingress to and egress from defined areas throughout the site. The processor controls information posted on various terminals in the site, such as a Security Portal and a parking lot pay booth, and on Variable Messaging Signs (VMS) at various locations within the site.

In one preferred embodiment, the video image processing is performed on processors, such as in personal computers or dedicated image processors networked throughout the site. In an alternative embodiment the video image processing is performed on a single processor that serves all of the cameras in the site.

The cameras can communicate with the video image processing system and/or the main processor by way of a communication network, such as a local area network (LAN), modem, RF modulator, wide area network (WAN), or global network such as the Internet.

The invention provides an automated system for performing various site security monitoring and site access-control actions based upon the different event types as defined by the user. The invention is an event-driven system activated by a camera reading a license plate and/or a temporary passive tag issued and controlled by the facility. The reading of the license plate is triggered either by the plate being detected within the camera video or by an optional trigger such as a light curtain or embedded loop. Events are processed to update the underlying LPN data held in various databases (or in various tables within a single database). Separate databases are maintained such as the site as a whole, for an employee parking lot, for a high-security parking lot, and for a visitor parking lot. In an alternative embodiment, the LPN information for the various facilities within the site may be stored in a single database. In addition, a loiterer database and speeder database may be created for the respective event types.

In one preferred embodiment, the employee parking lot is split across two levels with respective databases for level 1 and level 2, and the number of unoccupied parking spaces in each level is displayed on variable message signs.

Preferably, all vehicles entering the site are recorded on the site database. Vehicles in the employee parking lot, high-security parking lot or visitor parking lot are entered in the respective inventory databases. Vehicles which are not in these databases, but which are in the site database, are in transit on the site.

One preferred embodiment of the invention provides a system for monitoring and controlling access of vehicles as the vehicles seek access to and travel within a secure facility. The system of this embodiment includes multiple mobile monitoring stations distributed within the secure facility, vehicle databases, processors and a communication network for providing communication between the processors, the mobile monitoring units, and the vehicle databases. Each of the mobile monitoring stations comprise a video imaging device for capturing images of indicia such as license plate numbers on the vehicles. The stations each include a location determination device, such as a GPS receiver, for determining location coordinates of the mobile monitoring station. Each of the mobile stations also includes a video image processing system for operating on the captured images to identify one or more characters of the indicia.

The vehicle databases are for storing characters, such as license plate numbers, associated with vehicles that are within the secure facility and vehicles having prior authorization to enter restricted areas within the secure facility. One or more of the processors receive the characters identified by the video image processing system and access the vehicle databases to determine whether the identified characters correspond to characters stored in the vehicle databases. Depending on whether or not the identified characters correspond to characters stored in the databases, the system may initiate various actions, such as raising or lowering barrier gates, updating information in the databases, activating message signs in the secure facility to communicate with vehicle drivers, and alerting security personnel regarding vehicles that are speeding or loitering within the secure facility.

In another aspect, the invention provides a method for monitoring and controlling access of vehicles as the vehicles seek access to or travel within a secure facility. The method includes steps of (a) storing character information associated with vehicles traveling within the secure facility and vehicles having prior authorization to enter one or more areas within the secure facility, (b) capturing one or more images of indicia on a vehicle traveling within the secure facility or seeking access to one of the areas of the secure facility, (c) determining location coordinates of a location at which the one or more images of the vehicle are captured, (d) operating on the one or more images captured in step (b) to determine character information there from, and (e) comparing the character information determined in step (d) to the character information stored in step (a).

BRIEF DESCRIPTION OF THE DRAWINGS

Further advantages of the invention are apparent by reference to the detailed description when considered in conjunction with the figures which are not to scale so as to more clearly show the details, wherein like reference numbers indicate like elements throughout the several views, and wherein.

DETAILED DESCRIPTION

Figure 1:
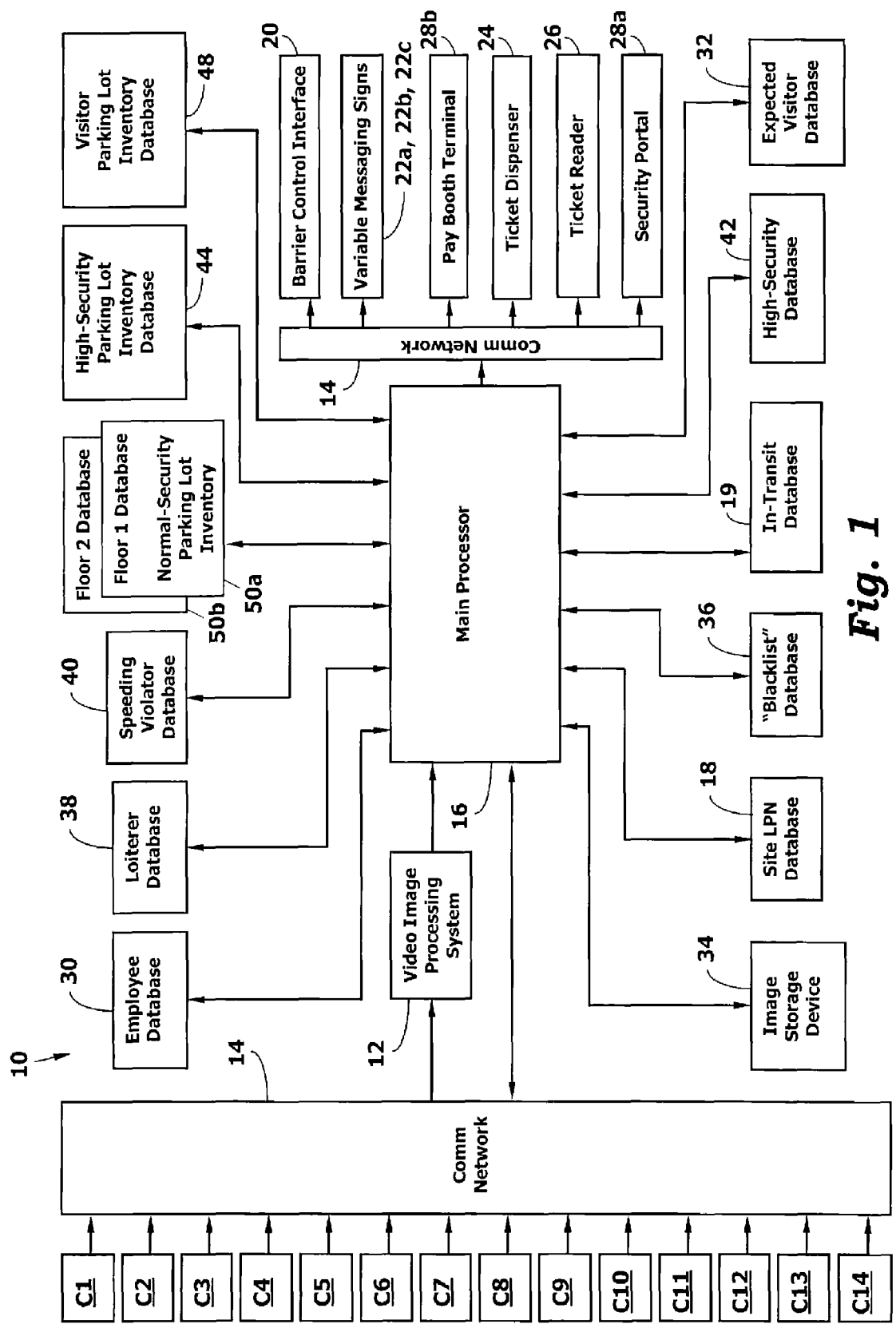
FIG. 1 depicts a functional block diagram of a site security, monitoring, and access control apparatus according to a preferred embodiment of the invention.
Figure 2:
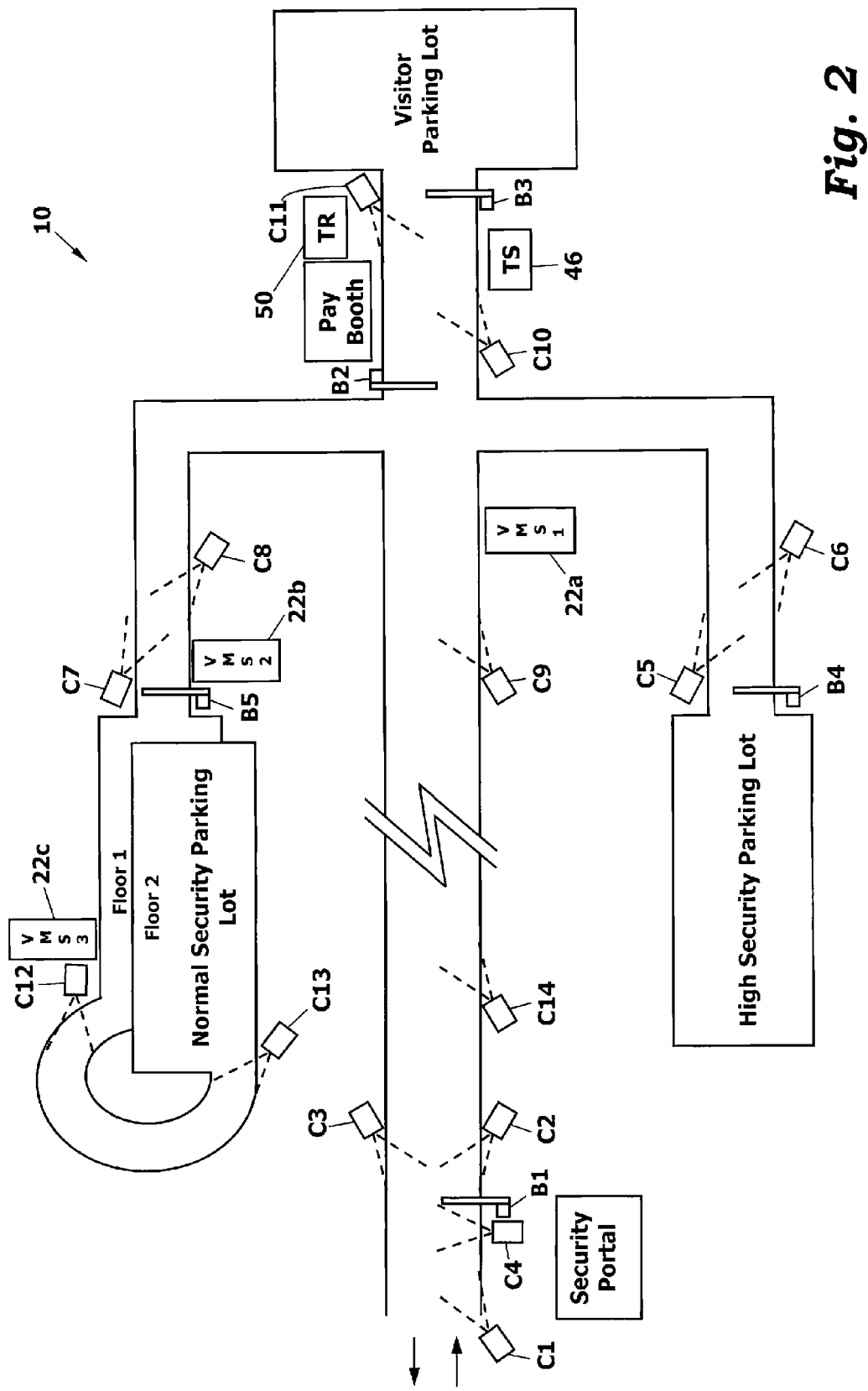
FIG. 2 depicts components of the site security, monitoring, and access control apparatus according to a preferred embodiment of the invention.

Depicted in FIGS. 1 and 2 is an automated system 10 for controlling access to a secure site, such as a military base or high-security research facility, and for monitoring location of vehicles traveling within the site. The system 10 includes a number of monitoring cameras, such as cameras C1-C14 depicted in FIG. 2 for capturing images of license plates, or of a passive tag issued by the facility, of vehicles entering, traveling within and exiting the site. In the preferred embodiment, the cameras C1, C3 and C5-C14, include an integrated infrared emitter for providing infrared illumination to a retro reflective surface on the license plate, such as cameras manufactured by PIPS Technology, Inc. of Knoxville, Tenn. under model numbers P356, P366, or P362. Using infrared illumination, the cameras C1, C3 and C5-C14 will covertly capture a license plate image at night or in the daylight. Where a vehicle does not display a license plate, an alternative passive tag will be issued by the facility and read in the same manner. The cameras C2 and C4 are preferably standard visible-light color video cameras.

Although the cameras C1, C3 and C5-C14 of the preferred embodiment are infrared cameras, the system 10 described herein may also incorporate visible light cameras with appropriate illumination if necessary for license plate image capture. Thus, it will be appreciated that the invention is not limited to any particular type of camera or imaging wavelength.

In the preferred embodiment of the invention, some or all of the cameras C1-C14 are connected to a video image processing system 12 via a communication network 14. The network 14 may be hard-wired, wireless, or fiber optic.

The video image processing system 12 receives video images captured by the cameras C1, C3 and C5-C14, such as images of vehicle license plates, and processes those images to recognize characters within the images, such as the vehicle license plate number (LPN) on the license plate. The video image processing system 12 may include a realtime hardware license plate detector such as described in United Kingdom patent number GB 2,332,322 entitled "Detection of Vehicle License Plates," or a software-based system such as used in the PIPS Technology PC-based "Autoplate" software. The video image processing system 12 provides the LPN to a main processor 16 that performs several functions based on the LPN, as described in more detail hereinafter.

In the embodiment depicted in FIG. 1, the video image processing system 12 is a central system that receives and processes video information from the multiple distributed video cameras C1, C3 and C5-C14. However, it will be appreciated by those skilled in the art that the video information processing could be distributed rather than central. For example, in an alternative embodiment of the invention depicted in FIG. 11, there are separate distributed video image processing systems 12a-12f associated with the cameras C1, C3 and C5-C14 used to capture vehicle license plate information. In the alternative, a remote processor could handle the input from the cameras. In this alternative embodiment, each of the distributed video image processing systems 12a-12f extracts the LPN from the license plate image captured by the local camera or cameras, and communicates the LPN, with a time-stamp and other pertinent information to the main processor 16 via the communication network 14. In the distributed system of FIG. 11, the barriers and VMS's are preferably controlled by the remote processors 12a-12f, such as the processors provided in the model P357 Processor manufactured by PIPS Technology Inc. While using remote processing to control such items as physical barriers, the system 10 could still refer to a central database or databases for the status of the vehicle.

Figure 11:
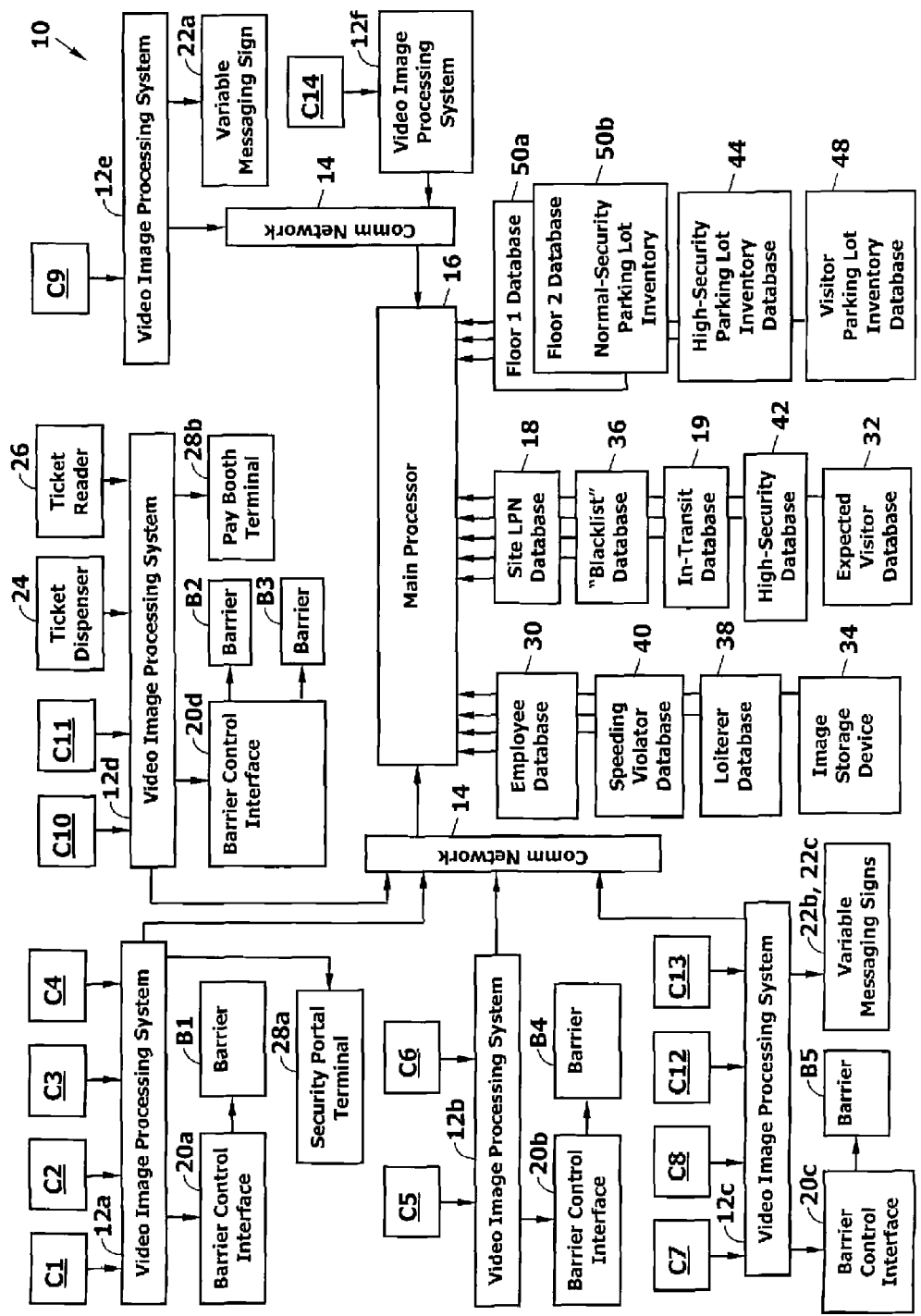
FIG. 11 depicts a functional block diagram of a site security, monitoring, and access control apparatus according to an alternative embodiment of the invention.

The communications infrastructure in such a distributed system requires less bandwidth because less video information is being transmitted over the communication network 14. The examples of system operation described hereinafter may be carried out using the central video image processing system 12 (FIG. 1) or the distributed video image processing systems 12a-12f (FIG. 11).

The main processor 16 has access to several databases, wherein LPNs are cross-referenced with other pertinent information. For example, as described in more detail below, the Site LPN Database 18 cross-references the LPNs of each and every vehicle that is within the site with the name of the vehicle operator, an image of the vehicle operator, the zones within the site to which the vehicle may have access, the time of the vehicle entry into the site, and other pertinent information. Other of the databases are described hereinafter. These databases are preferably stored on mass storage devices, such as magnetic or optical disks, directly interfaced to and co-located with the main processor 16. Alternatively, the databases may reside on one or more storage devices located remotely from the main processor 16, and accessed by the main processor 16 through the communication network 14.

With reference to FIG. 1, the main processor 16 is connected to one or more barrier control interfaces 20 through the communication network 14. Based on signals provided by the main processor 16, the barrier control interfaces 20 control barriers within the site 10 that may be opened to allow vehicles to proceed into or out of particular zones within the site 10, or closed to impede vehicle movement from one zone to another. Within the site 10 depicted in FIG. 2, there are five barriers B1-B5.

As shown in the preferred embodiment of FIG. 1, the main processor 16 is also connected via the communication network 14 to variable messaging signs (VMS) 22, 24, 26, such as signs manufactured by Addco and other such VMS suppliers. As the name implies, the message displayed on these signs may be changed based upon signals provided by the main processor 16. Exemplary uses of the signs 22, 24, 26 are described in more detail below.

Also connected to the main processor 16 via the communication network 14 are remote communication terminals 28, such as a Security Portal 28a and a Pay Booth Terminal 28b. As described in more detail hereinafter, the communication terminals 28 are used to communicate information from the main processor 16 to security and other personnel, such as in the Security Portal or Pay Booth. In the preferred embodiment, the communication terminals 28 are personal computers.

Figure 3:
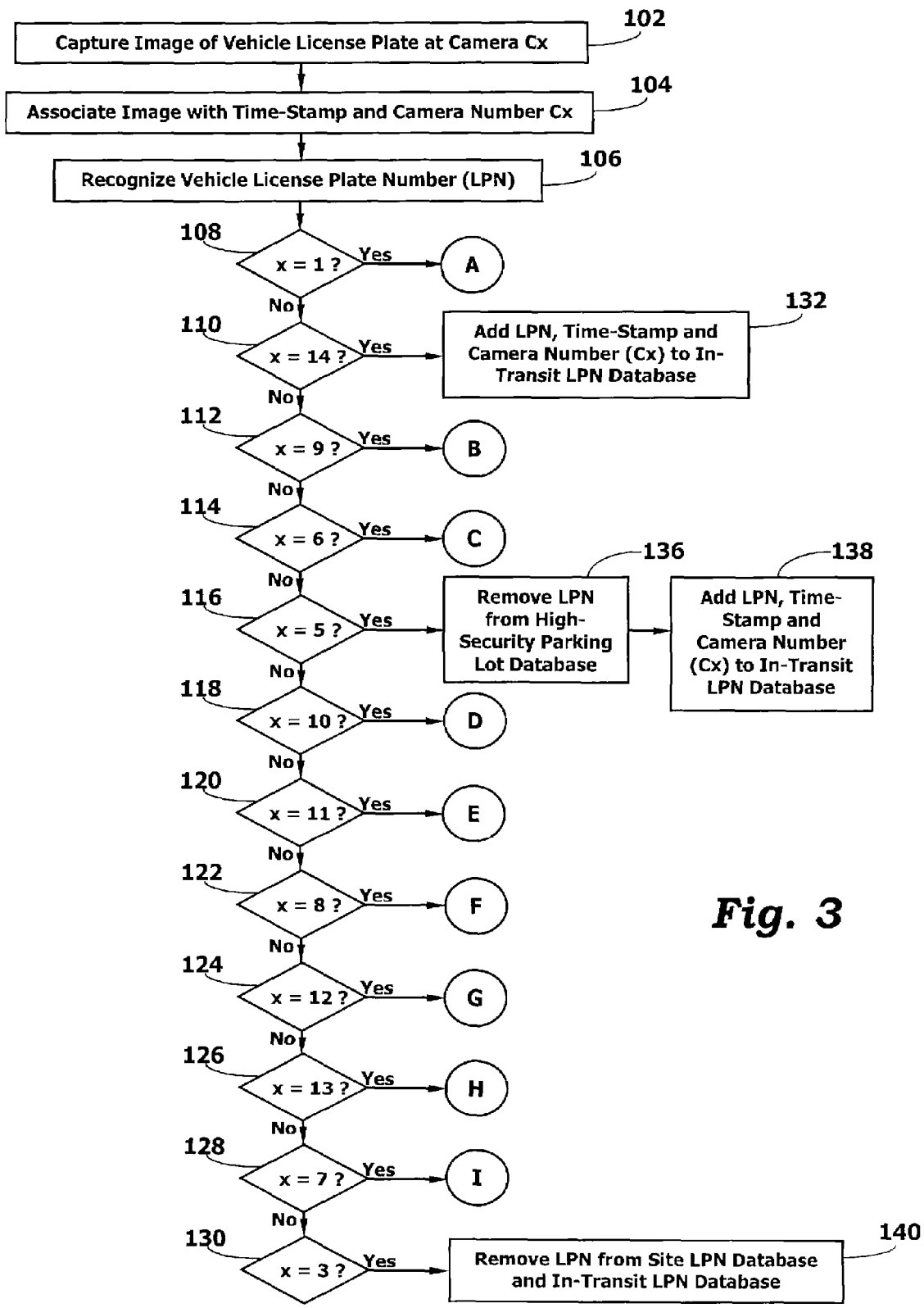
FIGS. 3-10 depict steps in event-driven monitoring and access control processes according to preferred embodiments of the invention.

As depicted in the flow diagram of FIG. 3, various actions performed by the system 10 are triggered by certain events, such as the detection of a vehicle in a particular location on the site. In a distributed system, such as depicted in FIG. 11, a physical presence trigger signal can be connected locally to the local Video Image Processor 12a-12f, rather than having to be communicated to the central processor.

In a preferred embodiment of the system 10, the presence of a vehicle is sensed by any one of the cameras C1, C3 and C5-C14, such as by detecting a license plate within an image of the vehicle. In other embodiments, the physical presence of a vehicle is sensed by a vehicle presence trigger or sensor, such as a magnetic sensor embedded in the pavement or an infrared sensor. Generally, physical presence sensors are used in the highest security applications, such as in detecting a vehicle approaching the entrance gate. Video triggering alone may be used in lower security applications, such as speed detection. In any event, it will be appreciated by those skilled in the art that either or both types of triggering may be used to initiate a sequence of events as described below, and that the invention is not limited to any particular type of event triggering.

As described in more detail below, once the presence of a vehicle has been detected, the subsequent processing steps preferably depend upon the location of the vehicle in the site. In the preferred embodiment, the location of the vehicle in the site is associated with a particular camera positioned at the location. Thus, in the processing described herein, the processing steps are determined by identification number of the camera at the location where the vehicle is detected.

As depicted in FIGS. 1, 2, and 3, when a vehicle approaches a camera location, the camera captures an image of the vehicle's license plate (step 102). In the preferred embodiment, a time-stamp, camera identifier and other pertinent information are associated with the image of the plate (step 104). Preferably, the time-stamp is information indicating the time and date that the image of the vehicle license plate was captured. The camera identifier is information indicating which camera in the system 10 captured the image of the license plate. For example, the camera identifier may be a TCP/IP address of the camera on the communication network 14. For purposes of this description, the cameras are identified by the reference numbers C1-C14. The image of the plate is transferred to the image processing system 12, such as via the communication network 14, and the image processing system 12 recognizes the characters of the LPN in the image of the plate using character recognition techniques, such as employed in products such as the PIPS Technology Inc. model P357 dedicated Automated License Plate Recognition (ALPR) processor or its "Autoplate" PC based ALPR software. (step 106). The LPN is then associated with the time-stamp, plate image, and other pertinent information.

Figure 4:
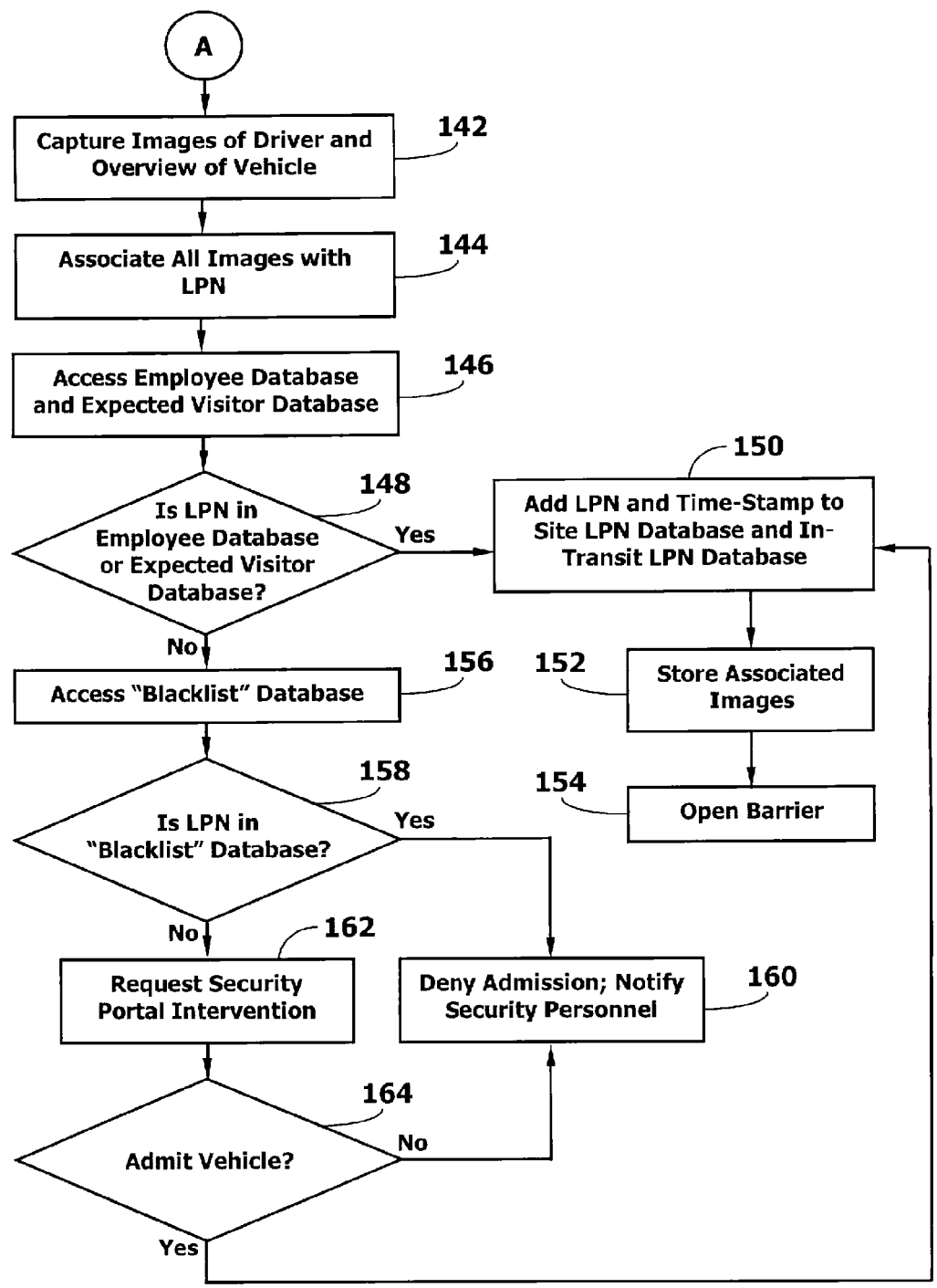

If the location of the vehicle corresponds to camera C1 (step 108), processing continues at point A in the flow diagram of FIG. 4. In the preferred embodiment, cameras C4 and C2 capture images of the driver and the front of the vehicle, respectively (step 142). The images of the vehicle license plate (from camera C1), the driver (from camera C4), and the vehicle overview (from camera C2) are then associated with the LPN (step 144).

As shown in FIG. 1, the system 10 may include an employee LPN database 30 in which the LPNs of all vehicles registered to the site employees are associated with other employee information, such as the employee name, identification number, security clearance level, zones within the site to which the employee may have access and employee photograph. The embodiment of the system may include an expected visitor database 32 in which the LPNs of all vehicles registered to expected visitors are associated with other visitor information, such as the visitor's name, the date of the expected visit, the name of the employee to be visited, and the zone(s) within the site to which the visitor may have access.

If properly engineered the database entries can provide a full historic record of all significant vehicle movements within the site, so that in the event of an 'incident,' the historic record, including the captured images, can be searched in order to provide evidence of the perpetrator. The system not only provides enhanced security measures, it also can be used as an evidentiary tool enabling historical data to be accessed. As an example, the status of a 'visitor' may not have been correctly identified at the Security Portal.

With continued reference to FIGS. 3 and 4, if the LPN recognized at step 104 is in the employee database 30 or the expected visitor database 32 (steps 146-148), the vehicle will be authorized for admittance to the site. As part of the preferred admission process, the LPN and a time-stamp are added to the site LPN database 18 (step 150) and to an In-Transit LPN database 19. Any additional information from the employee LPN database 30 or the expected visitor database 32 associated with the LPN is preferably stored in the site's LPN database 18. Preferably, images captured by the cameras C4 and C2 are also stored at this time, such as in an image storage device 34, and are associated with the LPN or other identifying information (step 152).

In the preferred embodiment, the barrier B1 is opened in response to a signal communicated from the main processor 16 to the barrier control interface 20 via the communication network 14 (step 154). In this manner, no human intervention is required to raise the barrier B1 and allow entry of the vehicle into the site, if the vehicle's LPN is in the employee LPN database 30 or the expected visitor database 32. Alternatively, the barrier B1 may be opened by a manual control located in the Security Portal.

If the LPN recognized at step 104 is not in the employee database 30 or the expected visitor database 32 (steps 146-

148), a "blacklist" database 36 is accessed to determine whether the LPN is stored therein (step 156). The "blacklist" database 36 preferably contains the LPNs associated with vehicles that are to be denied access to the site for any reason determined by the site facility management. For example, the "blacklist" database 36 may include the LPNs of vehicles used previously by persons who have violated security restrictions on the site or by persons known to be wanted by law enforcement officials and/or known or suspected terrorists. This may include both national, international and domestic suspects.

If the LPN recognized at step 104 is in the "blacklist" database 36 (step 158), security personnel are automatically notified (step 160). Preferably, the main processor 16 provides this notification by sending a configurable alert message and/or tone to the Security Portal that will be displayed on a display device 28a in the Security Portal. Additionally, an alert message may be e-mailed to security officials, on-site or off-site, who are authorized to be informed or warned that a "blacklisted" vehicle was attempting to enter the site.

If the LPN recognized at step 104 is not in the "blacklist" database 36 (step 158), security personnel in the Security Portal are notified that personal intervention is required (step 162). For example, security personnel may question the driver of the vehicle regarding his or her destination and business on the site, and the employee to be contacted to confirm whether the stated business is legitimate. If the vehicle is to be admitted (step 164), processing preferably continues at step 150. If the vehicle is not to be admitted (step 164), processing preferably continues at step 160.

If the location of the vehicle corresponds to camera C14 (step 110), the LPN, time-stamp, and camera identifier are added to the in-transit LPN database 19 (step 132) to be accessed in subsequent processing.

Figure 5:
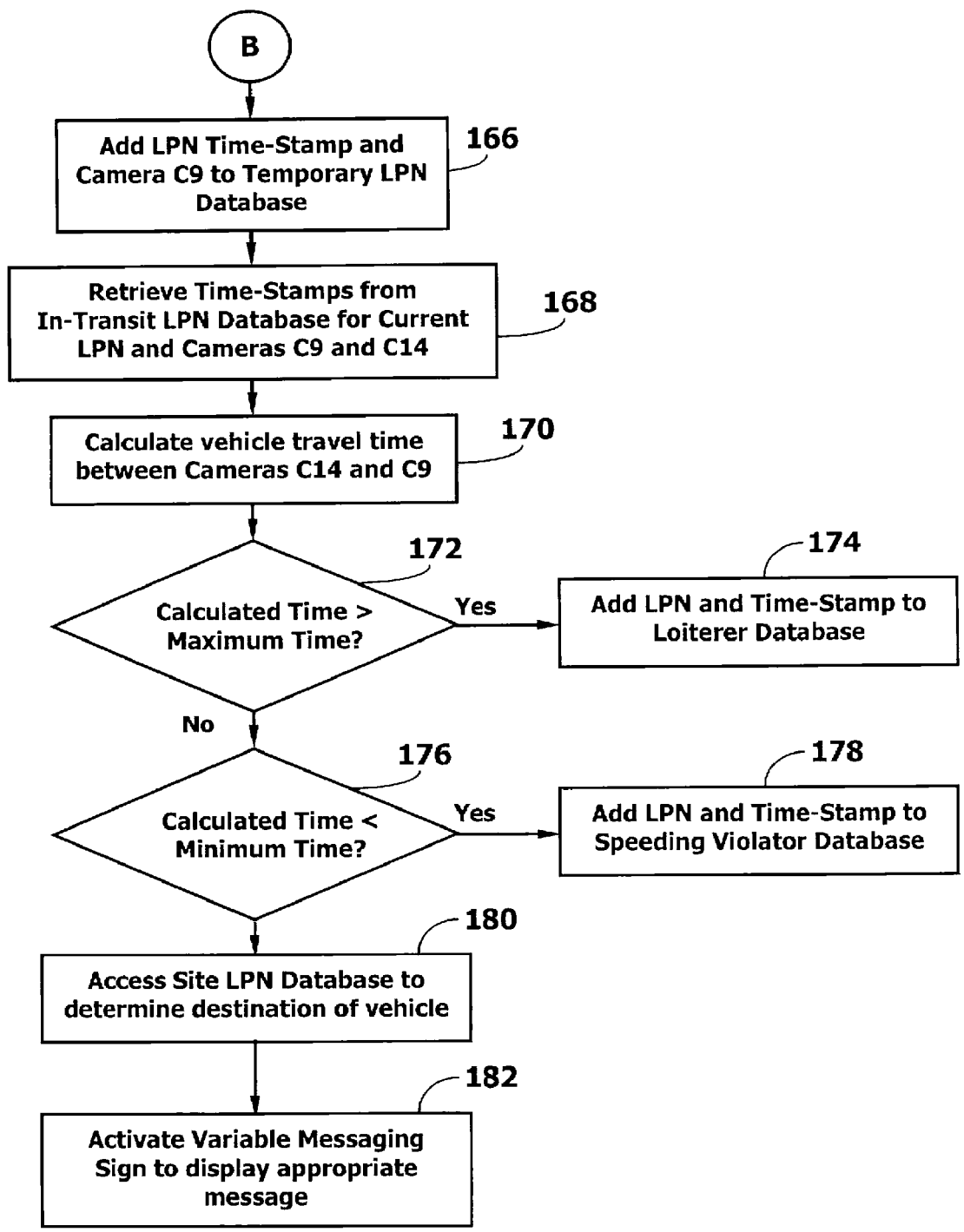

If the location of the vehicle corresponds to camera C9 (step 112), processing continues at point B in the flow diagram of FIG. 5. Preferably, the LPN, time-stamp and camera identifier are added to the in-transit LPN database 19 (step 166). The time-stamps associated with cameras C9 and C14 are retrieved from the in-transit LPN database 19 for the current LPN (step 168), and the time taken for the vehicle to travel from camera C14 to C9 is calculated (step 170). If the vehicle travel time between cameras C14 and C9 is greater than the facility's predetermined maximum time (step 172), then the vehicle is designated as a "loiterer". This may occur, for example, if the operator of the vehicle made an unauthorized stop to take photographs of a sensitive facility at some point between the two cameras. In this situation, the vehicle LPN and time-stamp are added to a loiterer database 38 (step 174). In a preferred embodiment, security personnel are automatically notified when a LPN is added to the loiterer database 38 so that the security personnel may take appropriate action at the appropriate time.

In an alternative embodiment, when a vehicle passes camera C14, or otherwise is detected near the location of camera C14, the LPN, time-stamp, and camera identifier are added to the in-transit LPN database 19. At the same time, a counter or timer begins to measure elapsed time. If a maximum predetermined time elapses before the vehicle is detected at camera C9, the vehicle LPN and time-stamp are added to the "loiterer" database 38 and security personnel are automatically notified.

If the vehicle travel time between cameras C14 and C9 is less than facility's predetermined minimum time (step 176), then the vehicle is designated as a "speeding violator". This may occur, for example, if the vehicle exceeds the posted speed limit on the section of road between the two cameras. In this situation, the vehicle LPN and time-stamp are added to a speeder database 40 (step 178). Preferably, security personnel are automatically notified when a LPN is added to the speeder database 40 so that the security personnel may take appropriate action at the appropriate time. Also, the main processor 16 may generate a notification that is communicated through the communication network 14 to the VMS 22 to notify the operator of the vehicle that the vehicle had been in violation of the posted speed limit.

With continued reference to FIGS. 2 and 5, when the vehicle has been detected at camera C9, the system 10 of the preferred embodiment activates the VMS 22 to provide pertinent information to the driver of the vehicle (step 182). This is preferably accomplished by first accessing the site LPN database 18 to determine the destination of the vehicle within the site (step 180). The VMS 22a is then activated to display a message, such as information regarding the vehicle's destination. For example, if the information accessed from the site LPN database indicates that the vehicle is destined for the visitor parking lot, the VMS 22a may display directions to that destination.

Figure 6:
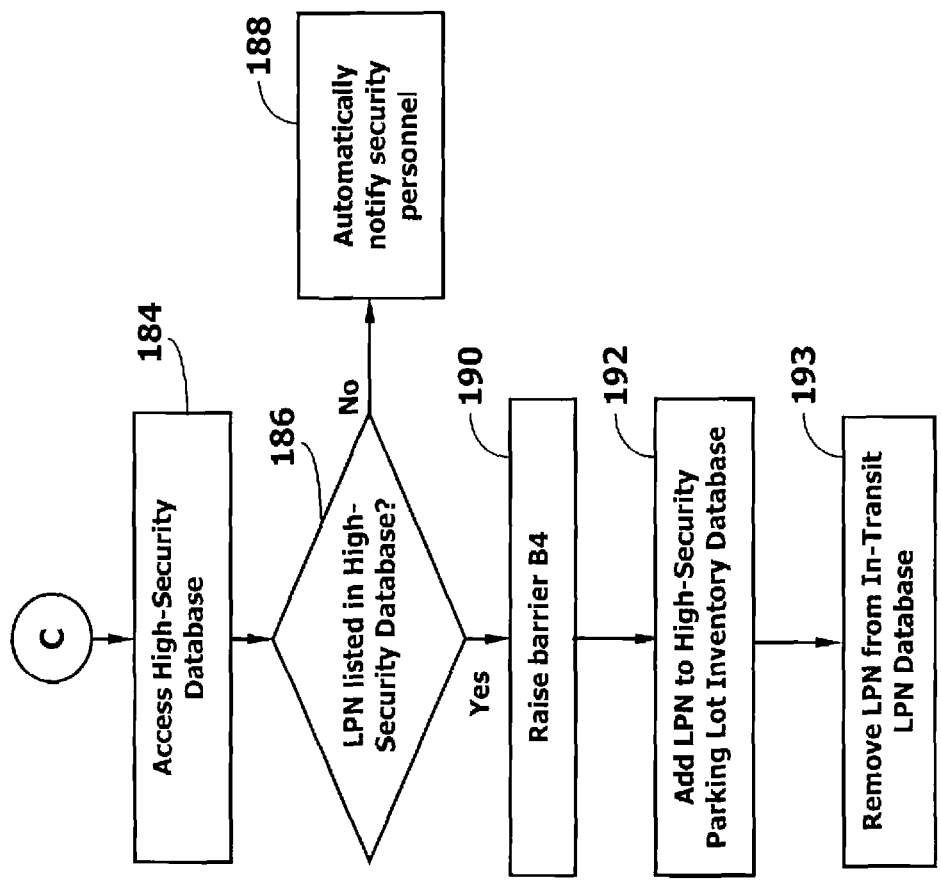

If the location of the vehicle corresponds to camera C6 at the entrance to the high security parking lot (step 114), processing continues at point C in the flow diagram of FIG. 6. In the preferred embodiment, the main processor 16 accesses a high-security database 42 (step 184), and a determination is made whether the detected LPN is listed therein in association with an employee or visitor having a high-security clearance (step 186). If the detected LPN is in the high-security database 42 (step 186), a signal is provided via the barrier control interface 20 to raise the barrier B4 or a like device to allow the vehicle to proceed into the high security parking lot. Preferably, the vehicle's LPN and associated time-stamp are then added to a high security parking lot inventory database 44. If the detected LPN is not in the high-security database 42 (step 186), the vehicle is denied entry into the high security parking lot and security personnel are automatically notified (step 188).

With reference to FIG. 3, if the location of the vehicle corresponds to camera C5 at the exit from the high security parking lot (step 116), the LPN is removed from the high security parking lot inventory database 44 (step 136), and the LPN, time-stamp and camera identifier (such as C5) are added to the in-transit LPN database 19 (step 138). This process is repeated so long as the vehicle remains on the monitored facility.

Figure 7:
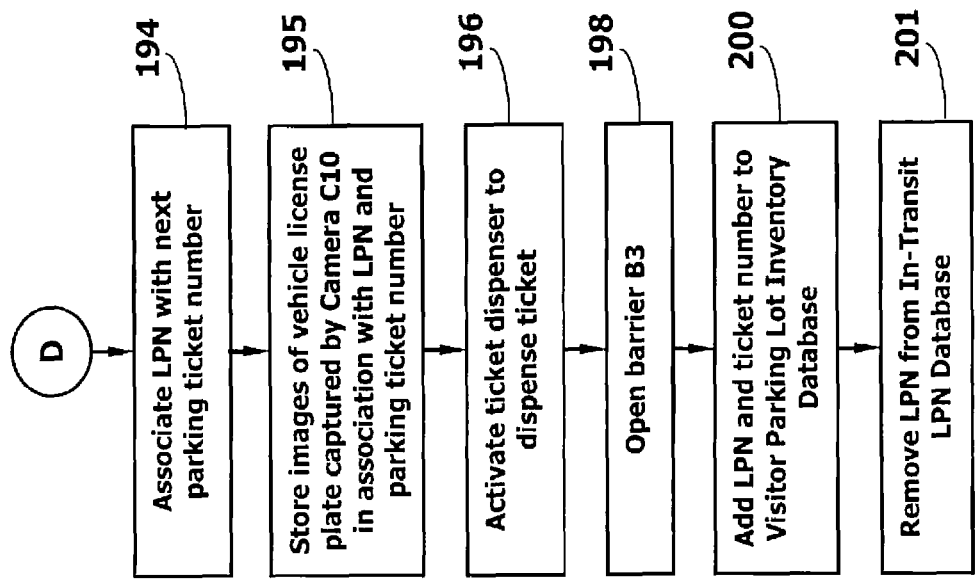

As depicted in the flow chart of FIG. 3, if the location of the vehicle corresponds to camera C10 at the entrance to the visitor parking lot (step 118), processing continues at point D in the flow diagram of FIG. 7. In the preferred embodiment, the detected LPN may be associated with a parking ticket number (step 194), such as the next parking ticket number in a sequence of numbers, and the image of the vehicle license plate captured by the camera C10 is stored in association with the LPN and ticket number (step 195). A parking ticket dispenser 24 is then activated to dispense a parking ticket having printed thereon the parking ticket number associated with the LPN (step 196). In addition to a numeric representation of the ticket number, there is also preferably an encoded version of the ticket number, such as in a bar-code or encoded magnetic stripe. In the preferred embodiment, once the ticket has been removed from the parking ticket dispenser 24, the barrier B3 is raised (step 198), and the LPN, time-stamp, and ticket number are added to the visitor parking lot inventory database 48 (step 200). The processes mentioned herein generally relate to those facilities that utilize automated ticket dispensers as part of their parking control.

Figure 8:
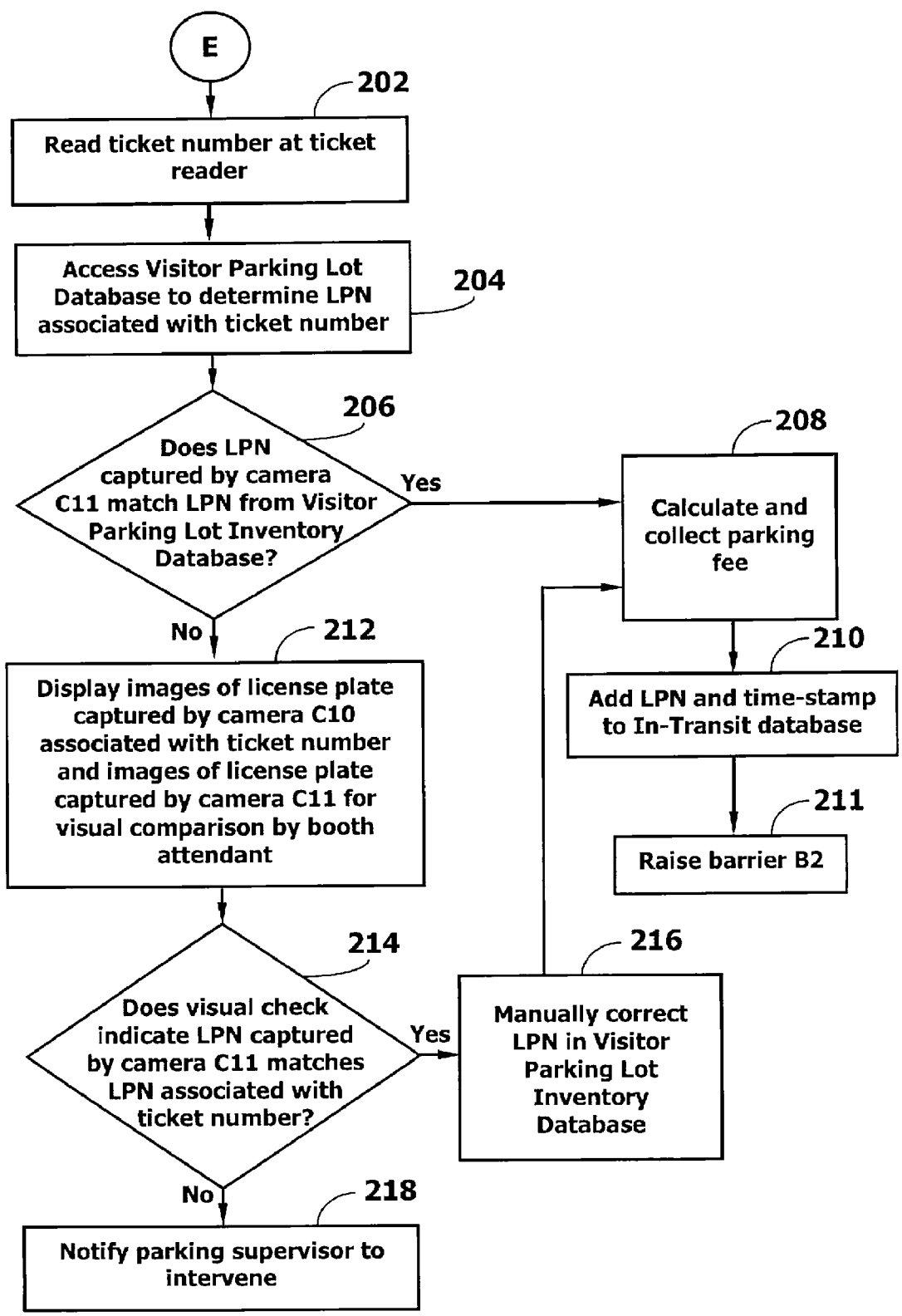

If the location of the vehicle corresponds to camera C11 at the exit from the visitor parking lot (step 120), processing continues at point E in the flow diagram of FIG. 8. The preferred embodiment of the invention includes a ticket reader 26 for receiving the parking ticket from the vehicle operator and for reading the encoded parking ticket number from the parking ticket (step 202). In one preferred embodiment, the ticket reader 26 comprises a bar-code reader. After the ticket number has been read from the parking ticket, the visitor parking lot inventory database 48 is accessed to retrieve the LPN that was associated with the ticket number at the time the ticket was dispensed (step 204). If the LPN retrieved from the visitor parking lot inventory database 48 matches the LPN captured by the camera C11 at the exit from the parking lot (step 206), a parking fee is calculated based upon the duration of stay as computed by the system. The calculated fee becomes due prior to exit (step 208). The LPN and time-stamp are then added to the in-transit LPN database 19 (step 210), and the barrier B2 is raised to allow the vehicle to exit the visitor parking lot (step 211). As outlined in the preceding paragraph, all of these processes lend themselves to commercial applications. Even in this environment, enhanced security will be achieved.

If the LPN retrieved from the visitor parking lot inventory database 48 does not match the LPN captured by the camera C11 at the exit from the parking lot (step 206), the system 10 initiates a process to resolve the mismatch. In the preferred embodiment, the image of the vehicle license plate associated with the ticket number read by the ticket reader 26 is retrieved and displayed at the pay booth terminal 28b (step 212). Also displayed at the pay booth terminal 28b is the image of the vehicle license plate captured by the camera C11 (step 212). Preferably, the booth attendant will visually compare the two images to determine a match (step 212).

If the visual check indicates that the LPN of the license plate imaged by the camera C11 does not match the LPN of the license plate imaged by the camera C10 that was associated with the ticket number (step 214), the pay booth attendant manually corrects the LPN in the visitor parking lot inventory database 48 to match the LPN shown in the images (step 216). This manual intervention would generally only occur in exceptional circumstances. The LPN and time-stamp are then preferably added to the in-transit LPN database 19 (step 210), and the barrier B2 or like device is actuated to allow the vehicle to exit the visitor parking lot (step 211).

If the visual check indicates that the LPN of the license plate imaged by the camera C11 does not match the LPN of the license plate imaged by the camera C10 that was associated with the ticket number (step 214), the parking supervisor could be notified, preferably automatically such as by email, that personal intervention is necessary (step 218). This situation occurs, for example, if someone attempts to exit the parking lot using a ticket that was dispensed to the driver of another vehicle.

Figure 9:
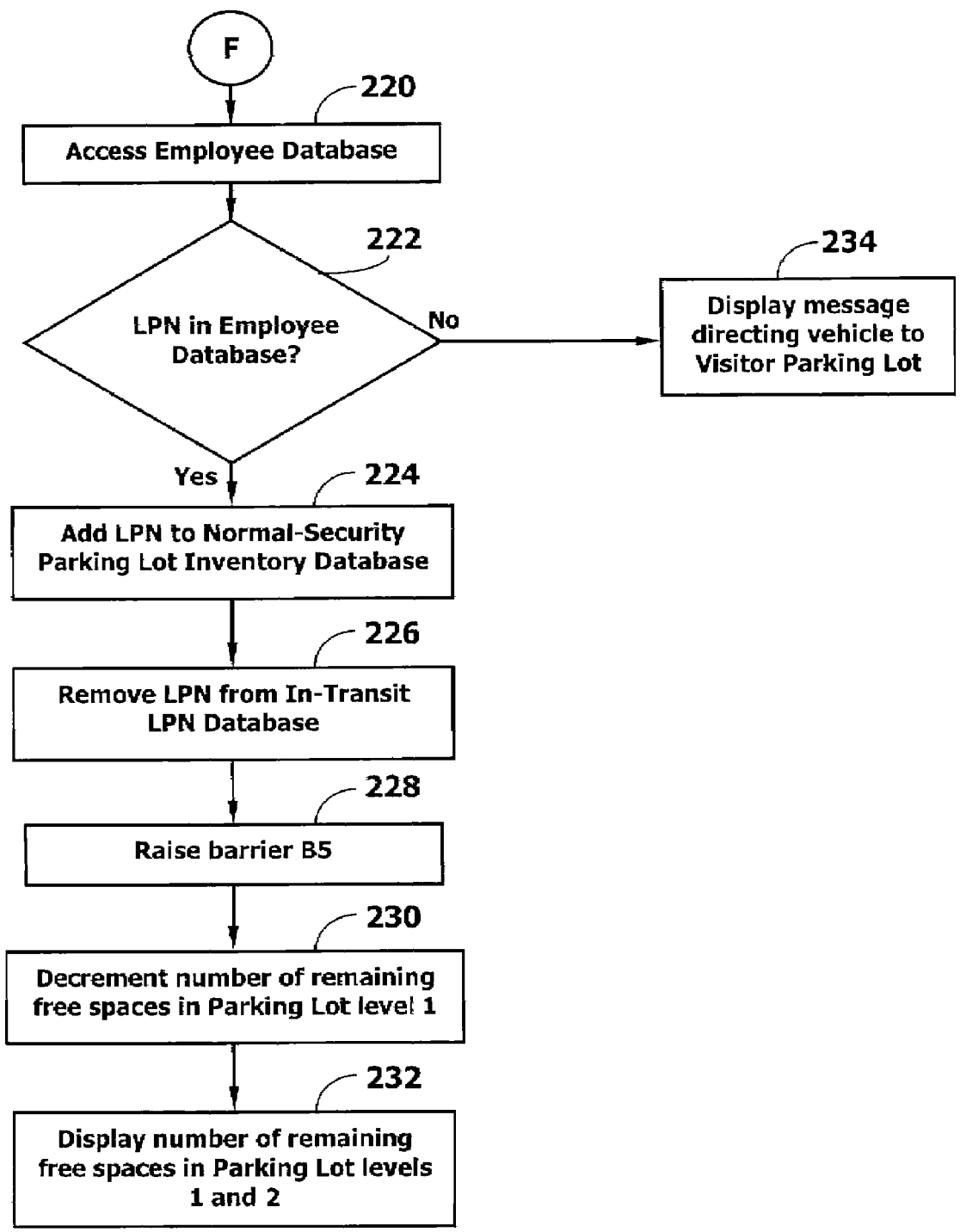

If the location of the vehicle corresponds to camera C8 at the entrance to the normal security parking lot (step 122), processing continues at point F in the flow diagram of FIG. 9. In the preferred embodiment, the main processor 16 accesses the employee database 30 (step 220), and a determination is made whether the detected LPN is listed therein (step 222). If the detected LPN is in the employee database 30 (step 222), the vehicle's LPN and associated time stamp are then preferably added to a normal-security parking lot first level inventory database 50a (step 224), and removed from the in-transit LPN database 19 (step 226). A signal is provided via the barrier control interface 20 to actuate the barrier B5 or like device to allow the vehicle to proceed into the normal-security parking lot (step 228). In the preferred embodiment, a value indicating the number of remaining unoccupied parking spaces in level one of the parking lot is decremented (step 230). Preferably, this value is a record stored in the normal-security parking lot first level inventory database 50a. The number of unoccupied parking spaces in levels one and two of the normal-security parking lot are then preferably displayed on the VMS 22b at the entrance to level one of the normal-security parking lot, and on the VMS 22c at the entrance to level two of the normal-security parking lot (step 232). This process would apply regardless of the number of levels available in each parking lot.

If the detected LPN is not in the employee database 30 (step 222), the vehicle is denied entry into the normal-security parking lot by the use of a barrier or like device and an automatic message is displayed on the VMS 22b to direct the vehicle to the authorized parking lot (step 234). Security personnel can be automatically notified that an unauthorized vehicle has attempted entry into an unauthorized parking lot.

Figure 10:
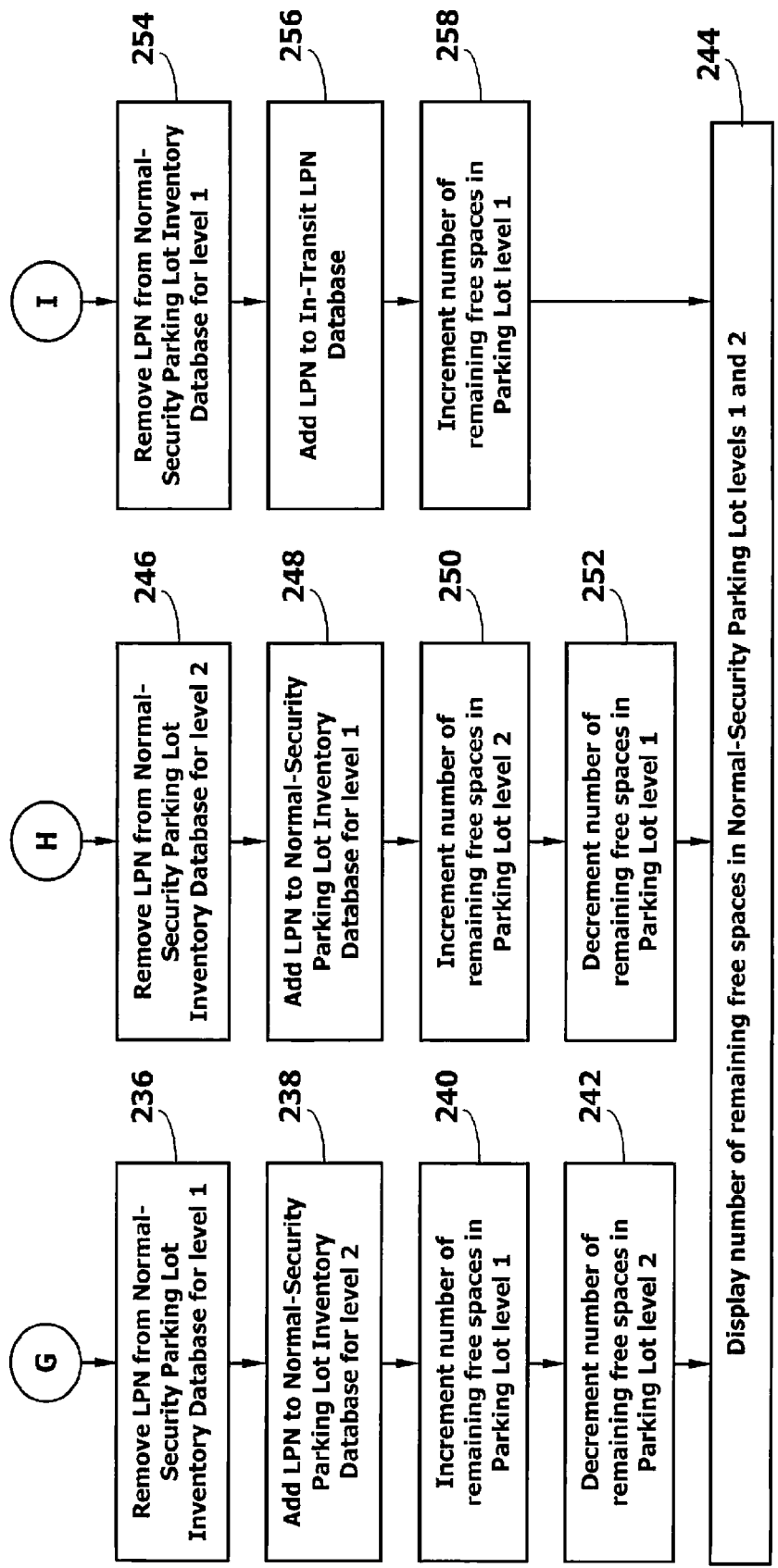

If the location of the vehicle corresponds to camera C12 at the entrance to level two of the normal-security parking lot (step 124), processing continues at point G in the flow diagram of FIG. 10. In the preferred embodiment, the vehicle's LPN and associated time stamp are preferably removed from the normal-security parking lot first level inventory database 50a (step 236), and added to the normal-security parking lot second level inventory database 50b (step 238). Preferably, the value indicating the number of unoccupied parking spaces in level one of the parking lot is incremented (step 240), and a value indicating the number of unoccupied parking spaces in level two of the parking lot is decremented (step 242). In the preferred embodiment, the value indicating the number of unoccupied parking spaces in level two of the parking lot is a record stored in the normal-security parking lot second level inventory database 50b. The number of unoccupied parking spaces in levels one and two of the normal-security parking lot are then preferably displayed on the VMS 22b at the entrance to level one of the normal-security parking lot, and on the VMS 22c at the entrance to level two of the normal-security parking lot (step 244).

If the location of the vehicle corresponds to camera C13 at the exit from level two of the normal-security parking lot (step 126), processing continues at point H in the flow diagram of FIG. 10. In the preferred embodiment, the vehicle's LPN and associated time stamp are preferably removed from the normal-security parking lot second level inventory database 50b (step 246), and added to the normal-security parking lot first level inventory database 50a (step 248). Preferably, the value indicating the number of unoccupied parking spaces in level two of the parking lot is incremented (step 250), and a value indicating the number of unoccupied parking spaces in level one of the parking lot is decremented (step 252). Again, the number of unoccupied parking spaces in levels one and two of the normal-security parking lots are then preferably displayed on the VMS's 22b and 22c (step 244).

If the location of the vehicle corresponds to camera C7 at the exit from level one of the normal-security parking lot (step 128), processing continues at point I in the flow diagram of FIG. 10. In the preferred embodiment, the vehicle's LPN and associated time stamp are preferably removed from the normal-security parking lot first level inventory database 50a (step 254), and added to the in-transit LPN database 19 (step 256). Preferably, the value indicating the number of unoccupied parking spaces in level one of the parking lot is incremented (step 258) and the number of unoccupied parking spaces in levels one and two of the normal-security parking lot are displayed on the VMS 22b and 22c (step 244). If the location of the vehicle corresponds to camera C3 at the exit from the site (step 130), the vehicle's LPN is preferably removed from the site LPN database 18 and the in-transit LPN database 19 (step 140).

Figure 12:
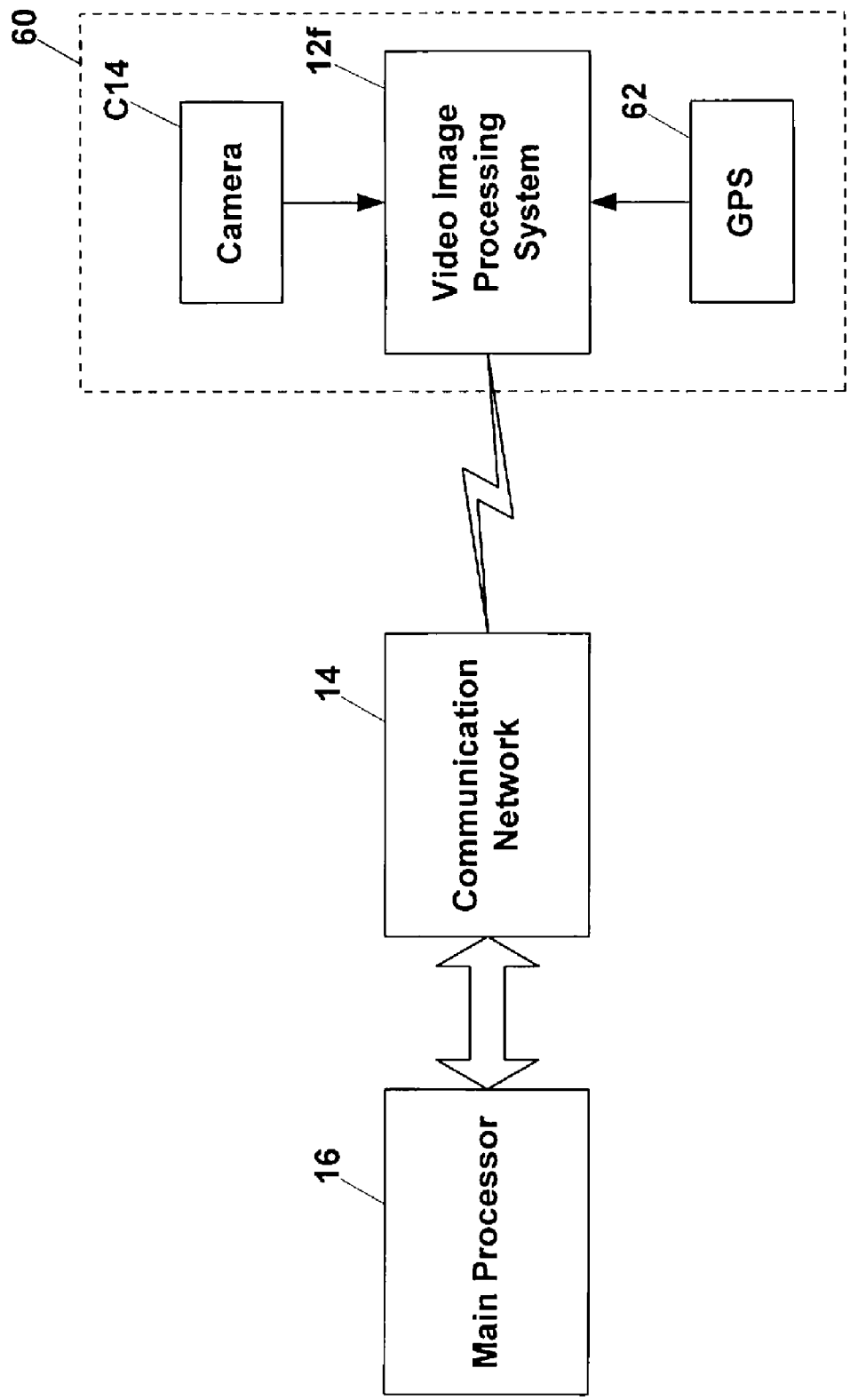
FIG. 12 depicts a mobile monitoring station according to a preferred embodiment of the invention.

FIG. 12 depicts a preferred embodiment of the invention wherein the camera C14 and the video image processing system 12f are components of a mobile monitoring station 60. The mobile station 60 also includes a location determination unit 62, such as a GPS receiver, for providing location coordinates to the video image processing system 60. In this embodiment, the communication network 14 provides wireless communication between the mobile station 60 and the main processor 16. For example, wireless communication may be implemented via a terrestrial radio frequency (RF) link, such as a microwave or a Wi-Fi (IEEE 802.11) link, or via a satellite link.

Preferably, the camera C14, video image processing system 12f and location determination unit 62 of the mobile station 60 are mounted on or installed in a trailer that may be hauled to any desired location within the facility. Alternatively, the components of the mobile station 60 may be permanently or semi-permanently installed in a vehicle. These trailer-mounted or vehicle mounted embodiments allow for rapid deployment of a mobile station 60 in emergency situations and temporary deployments as needed.

In a preferred embodiment, multiple mobile stations 60 are deployed at various locations throughout the secure facility. For example, a pair of mobile stations 60 is particularly applicable in detecting speed limit violators and loiterers as discussed above. In this embodiment, the camera C9, video image processing system 12e and variable messaging sign 22a may also be components of a mobile monitoring station 60 having a GPS receiver 62.

In applications involving a mobile monitoring station 60, location coordinates (such as determined by the GPS unit 62) are transmitted to the main processor 16 along with the LPN, time-stamp and camera identifier. In these applications, the location coordinates may be stored in one or more of the databases along with the other pertinent information. For example, location coordinates may be added to the in-transit database 19 at step 132 in FIG. 3 and at step 166 in FIG. 5, to the loiterer database 38 at step 174 in FIG. 5, and to the speeding violator database 40 at step 178 in FIG. 5.

The foregoing description of preferred embodiments for this invention have been presented for purposes of illustration and description. Obvious modifications or variations are possible in light of the above teachings and illustrations. The embodiments are chosen and described in an effort to provide the best illustrations of the principles of the invention and its practical application, and to thereby enable one of ordinary skill in the art to utilize the invention in various embodiments and with various modifications as is suited to the particular use contemplated.

What is claimed is:

1. A system for monitoring and controlling access of vehicles as the vehicles seek access to and travel within a secure facility, the system comprising:
   one or more vehicle databases for storing first license plate characters associated with a vehicle located within the secure facility, first location coordinates corresponding to a first location at which the first license plate characters were captured in a first image, and a first timestamp corresponding to a first time at which the first license plate characters were captured in the first image;
   one or more mobile monitoring stations distributed within the secure facility, each mobile monitoring station comprising:
      a video imaging device for capturing a second images of indicia on vehicles located within the facility;
      a location determination device for determining second location coordinates of the mobile monitoring station positioned at a second location; and
      a video image processing system in communication with the video imaging device for operating on the second images of the indicia to identify second license plate characters therein, the video image processing system for wirelessly transmitting the second license plate characters, the second location coordinates, and a second timestamp indicating a second time at which the second image was captured;
   one or more processors in communication with one or more of the video imaging processing systems of the one or more mobile monitoring stations and in communication with the one or more vehicle databases, the one or more processors for
      receiving the second license plate characters, the second location coordinates and the second timestamp,
      accessing the one or more vehicle databases to determine whether the second license plate characters match the first license plate characters, and
      when the second license plate characters match the first license plate characters, processing the first and second location coordinates to determine information indicative of movement of the vehicle during an elapsed time between the first time and the second time, and generating an output based on the information indicative of movement of the vehicle during the elapsed time; and
   a communication network for providing communication between the processors, the mobile monitoring stations, and the vehicle databases.

2. The system of claim 1 wherein the one or more processors are operable to process the first and second location coordinates to determine a distance between the first and second locations, to process the first and second timestamps to determine an elapsed time between the first and second times, and to generate the output based on the distance and the elapsed time.

3. The system of claim 1 wherein:
   the one or more vehicle databases include an on-site vehicle database for storing information associated with vehicles that are within the secure facility; and
   the one or more processors are operable to provide to the on-site vehicle database information associated with the vehicles that has entered the secure facility as indicated by the first or second location coordinates.

4. The system of claim 1 further comprising:
   the one or more vehicle databases including a blacklist database for storing information associated with vehicles that should not have access to a restricted area of the secure facility;
   a security portal for communicating information from the one or more processors to security personnel; and
   the one or more processors in communication with the blacklist database for accessing the blacklist database to determine whether the first or second license plate characters correspond to characters associated with a black-listed vehicles that should not have access to a restricted area of the secure facility, and upon entry of a black-listed vehicle into a restricted area as indicated by the first or second location coordinates, providing information to the security portal to alert the security personnel that a black-listed vehicle has entered a restricted area of the secure facility.

5. The system of claim 1 wherein:
the one or more vehicle databases include an in-transit vehicle database for storing information associated with vehicles that have been admitted to the secure facility but which are not within a designated parking area within the secure facility;
the one or more vehicle databases include a parking area database for storing information associated with vehicles that are within a designated parking area within the secure facility; and
the one or more processors are operable to determine that a parked vehicle has second license late characters matching first license plate characters of a vehicle listed in the in-transit vehicle database,
determine that the second location coordinates of the parked vehicle correspond to a designated parking area
enter at least the second license plate characters into the parking area database, and
remove at least the first license plate characters from the in-transit vehicle database
thereby indicating that the parked vehicle is no longer in transit and is in a designated parking area within the secure facility.

6. The system of claim 1 wherein:
the one or more mobile monitoring stations include:
a first mobile monitoring station disposed at the first location within the secure facility, the video imaging device of the first mobile monitoring station for capturing the first image of indicia on an in-transit vehicle when the in-transit vehicle passes near the first mobile monitoring station at the first time indicated by the first timestamp, the video image processing system of the first mobile monitoring station for operating on the first image of the indicia to identify the first license plate characters in the first image; and
a second mobile monitoring station disposed at the second location within the secure facility, the video imaging device of the second mobile monitoring station for capturing the second image of indicia on the in-transit vehicle when the in-transit vehicle passes near the second mobile monitoring station at the second time indicated by the second timestamp, the video image processing system of the second mobile monitoring station for operating on the second image of the indicia to identify the second license plate characters in the second image; and
the one or more processors are operable to
receive the first and second characters and determine that the second license plate characters match the first license plate characters,
receive the first and second timestamps,
receive the first and second location coordinates indicating the first and second locations,
determine a distance between the first and second locations based on the first and second location coordinates, and
determine an in-transit time between the first and second locations based on the difference between the first timestamp and the second timestamp.

7. The system of claim 6 wherein:
the one or more vehicle databases include a speeder database for storing information associated with vehicles that have exceeded a speed limit within the secure facility; and
the one or more processors are for generating a speeding alert signal when the in-transit time is less than a predetermined minimum time, communicating the speeding alert signal to a security portal to notify security personnel of a speeding vehicle, and providing to the speeder database information associated with vehicles that have exceeded the speed limit within the secure facility.

8. The system of claim 6 further comprising:
a variable message sign for displaying visual messages to operators of vehicles within the secure facility, the variable message sign in communication with the one or more processors; and
the one or more processors for generating a speeding alert signal when the in-transit time is less than a predetermined minimum time, and communicating the speeding alert signal to the variable message sign to notify an operator of a speeding vehicle that the vehicle has been detected exceeding a speed limit.

9. The system of claim 6 wherein:
the one or more vehicle databases include a loiterer database for storing information associated with vehicles that are determined to have loitered within the secure facility; and
the one or more processors are for generating a loitering alert signal when the in-transit time is greater than a predetermined maximum time, communicating the loitering alert signal to a security portal to notify security personnel of a loitering vehicle, and providing to the loiterer database information associated with vehicles that are determined to have loitered within the secure facility.

10. The system of claim 1 wherein:
the one or more mobile monitoring stations include:
a first mobile monitoring station disposed at an entrance to a parking area within the secure facility, the video imaging device of the first mobile monitoring station for capturing the first images of indicia on a vehicles entering the parking area, the video image processing system of the first mobile monitoring station for operating on the first image of the indicia to identify the first license plate characters in the first image; and
a second mobile monitoring station disposed at an exit to the parking area, the video imaging device of the second mobile monitoring station for capturing the second image of indicia on a vehicles exiting the parking area, the video image processing system of the second mobile monitoring station for operating on the second image of the indicia to identify the second license plate characters in the second image;
the one or more vehicle databases include a parking area database for storing characters associated with vehicles that have entered the parking area; and
the one or more processors for providing to the parking area database information associated with vehicles that have entered the parking area, and for removing from the parking area database information associated with vehicles that have exited the parking area.

11. The system of claim 10 wherein:
the one or more vehicle databases include an in-transit vehicle database for storing information associated with vehicles that have been admitted to the secure facility and are in transit within the secure facility; and
the one or more processors are for removing from the in-transit vehicle database information associated with vehicles that have entered the parking area, and for providing to the in-transit vehicle database information associated with vehicles that have exited the parking area.

12. The system of claim 10 further comprising:
a variable message sign for displaying visual messages to operators of vehicles within the secure facility, the variable message sign in communication with the one or more processors; and
the one or more processors for maintaining a count of vehicles that are in the parking area at any given time, and communicating information related to the count to the variable message sign to notify an operator of a vehicle regarding a number of available parking spaces in the parking area.

13. The system of claim 1 wherein each of the one or more processors is a component of a corresponding one of the one or more mobile monitoring stations.

14. The system of claim 1 wherein the one or more processors comprise a central processor in communication with all of the mobile monitoring stations.

15. A method for monitoring and controlling access of vehicles as the vehicles seek access to or travel within a secure facility, the method comprising:
(a) storing first license plate character information associated with a vehicles traveling within the secure facility;
(b) storing first location coordinates corresponding to a first location at which the first license plate characters were captured in a first image;
(c) capturing a second images of indicia on a vehicle traveling within the secure facility or seeking access to an area of the secure facility;
(d) determining second location coordinates of a second location at which the second image of the vehicle was captured;
(e) operating on the second images to determine second license plate character information there from;
(f) comparing the second license plate character information to the first license plate character information; and
(g) when the first license plate character information matches the second license plate character information, processing the first and second location coordinates to determine information indicative of movement of the vehicle within the secure facility.

16. The method of claim 15 further comprising:
(g) controlling the operation of a barrier that blocks vehicle access to one of the areas of the secure facility;
(h) moving the barrier to allow a vehicle to access the area of the secure facility when the second license plate character information corresponds to stored license plate character information associated with a vehicle having prior authorization to travel into the area of the secure facility.

17. The method of claim 16 further comprising:
(i) storing first license plate character information in an in-transit vehicle database indicating that the vehicle allowed access in step (h) is in transit within the area of the secure facility;
(j) capturing one or more images of indicia on the vehicle as it enters a parking area of the secure facility;
(k) operating on the one or more images captured in step (j) to determine second license plate character information there from;
(l) comparing the second license plate character information to the first license plate character information; and
(m) operating on the in-transit vehicle database to indicate that the vehicle having the second license plate character information is no longer in transit within the secure facility.

18. The method of claim 17 further comprising:
(n) capturing one or more images of indicia on the vehicle as the vehicle exits the parking area of the secure facility;
(o) operating on the one or more images captured in step (n) to determine third license plate character information there from;
(p) comparing the second license plate character information to the third license plate character information; and
(q) operating on the in-transit vehicle database to indicate that the vehicle having the third license plate character information is in transit within the secure facility.

19. The method of claim 15 further comprising:
(g) storing in the one or more vehicle databases first license plate character information associated with vehicles that are restricted from accessing one or more areas within the secure facility;
step (b) including capturing one or more images of indicia on a vehicle seeking access to a restricted area of the secure facility;
step (d) including operating on the one or more images captured in step (b) to determine second license plate character information there from;
(h) comparing the second license plate character information to the first license plate character information stored in step (g); and
(i) communicating an alert signal to security personnel when the second license plate character information corresponds to the first license plate character information stored in step (g).

20. The method of claim 15 further comprising:
(g) determining an elapsed time between a first capture of indicia on a vehicle at a first location within the secure facility and a second capture of indicia on the same vehicle at a second location within the secure facility;
(h) determining whether the vehicle exceeded a speed limit while traveling between the first and second locations based on the elapsed time determined in step (g); and
(i) storing violation information associated with the vehicle if the vehicle exceeded the speed limit.

21. The method of claim 20 further comprising (j) sending speeding alert information to security personnel if the vehicle exceeded the speed limit.

22. The method of claim 15 further comprising:
(g) determining an elapsed time between a first capture of indicia on a vehicle at a first location within the secure facility and a second capture of indicia on the same vehicle at a second location within the secure facility;
(h) determining whether the vehicle loitered while traveling between the first and second locations based on the elapsed time determined in step (g); and
(i) storing violation information associated with the vehicle if the vehicle loitered between the first and second locations.

23. The method of claim 22 further comprising (j) sending loitering alert information to security personnel if the vehicle loitered within the secure facility.

24. The method of claim 15 further comprising:
(g) incrementing a count of vehicles in a parking area in the secure facility when a vehicle enters the parking area;
(h) decrementing the count of vehicles in the parking area when a vehicle exits the parking area;
(i) comparing the count of vehicles in the parking area to a capacity of the parking area;
(j) determining a number of parking spaces available in the parking area based on the comparison of step (i); and (k) displaying to an operator of a vehicle approaching the parking area a message related to the number of parking spaces determined in step (j).

25. A apparatus for monitoring and controlling access of vehicles as the vehicles seek access to or travel within a secure facility, the apparatus comprising:

means for storing first license plate character information associated with a vehicles traveling within the secure facility and for storing first location coordinates corresponding to a first location at which the first license late characters information was captured in a first image;

means for capturing a second image of indicia on a vehicle traveling within the secure facility or seeking access to one of the areas of the secure facility;

means for determining second location coordinates of a second location at which the second image of the vehicle was captured;

means for operating on the second images to determine second license plate character information there from;

means for comparing the second license plate character information to the first license plate character information; and means for processing the first and second location coordinates to determine information indicative of movement of the vehicle within the secure facility.

\* \* \* \* \*